United States Patent
Li et al.

(10) Patent No.: US 7,412,077 B2
(45) Date of Patent: Aug. 12, 2008

(54) APPARATUS AND METHODS FOR HEAD POSE ESTIMATION AND HEAD GESTURE DETECTION

(75) Inventors: Renxiang Li, Lake Zurich, IL (US); Carl M. Danielsen, Lake Zurich, IL (US); Cuneyt M. Taskiran, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 119 days.

(21) Appl. No.: 11/618,396

(22) Filed: Dec. 29, 2006

(65) Prior Publication Data

US 2008/0159596 A1 Jul. 3, 2008

(51) Int. Cl.
*G06K 9/00* (2006.01)
(52) U.S. Cl. .................. 382/103; 375/240.01
(58) Field of Classification Search .......... 382/103; 375/240.01
See application file for complete search history.

(56) References Cited

U.S. PATENT DOCUMENTS

| 5,805,736 | A  | * | 9/1998  | Kim ..................... 382/242 |
| 6,757,328 | B1 |   | 6/2004  | Huang et al. |
| 6,901,110 | B1 | * | 5/2005  | Tsougarakis et al. ... 375/240.12 |
| 7,095,786 | B1 | * | 8/2006  | Schonfeld et al. ...... 375/240.16 |
| 2004/0240708 | A1 | | 12/2004 | Hu et al. |
| 2005/0008196 | A1 | | 1/2005  | Liu et al. |
| 2005/0031166 | A1 | | 2/2005  | Fujimura et al. |

* cited by examiner

Primary Examiner—Tom Y Lu

(57) ABSTRACT

A method for head pose estimation may include receiving block motion vectors for a frame of video from a block motion estimator, selecting at least one block for analysis, determining an average motion vector for the at least one selected block, combining the average motion vectors over time (all past frames of video) to determine an accumulated average motion vector, estimating the orientation of a user's head in the video frame based on the accumulated average motion vector, and outputting at least one parameter indicative of the estimated orientation.

19 Claims, 4 Drawing Sheets

APPARATUS AND METHODS FOR HEAD POSE ESTIMATION AND HEAD GESTURE DETECTION

TECHNICAL FIELD

The present invention is directed to apparatus and method for head pose estimation and gesture detection. More particularly, the present invention is directed to methods and apparatus for head pose estimation and head gesture detection for use in avatar animation in, for example, low bandwidth and/or low processing power applications such as mobile devices.

BACKGROUND

As computers and electronic devices become more and more prevalent in today's society, attempts have been made to develop the human-computer interfaces to provide more personalization. One approach is the use of avatars—iconic representations of users drawn in two or three dimensions. Avatars are used in conventional instant messaging systems and kiosks. In these applications, users interact with avatar representations to communicate with other users or with the operating system.

In the case of instant messaging systems, a user selects his or her own avatar, which then appears to others when the user sends a message. It should be appreciated that some systems can be tailored to permit a recipient of data to choose the avatar to associate with each originator of the data. In either case, these avatars are relatively static, their motions and gestures selected from a small number of pre-created motion templates and not reflective of any actual motion of the person whom the avatar is representing.

Psychological and social studies have concluded that non-verbal communication cues, such as, for example, head gestures, play an important role in personal communication. Thus, in the context of real-time communication, it may be desirable to provide an avatar with motion and gestures that reflect the motion of the person whom the avatar is representing. Such simulated motion would provide the viewer with non-verbal communication information from the user. In order to simulate such motion, some type of head pose estimation or body movement estimation would need to be implemented.

Another use of avatars controlled directly by head gestures of a user is for human and device interaction. For example, speech input to a mobile device with the word "Yes" may not be accurately detected in a noisy environment. However, with detection of user nodding, the user's input can be more reliably determined.

Conventional methods for head pose simulation and/or body pose simulation typically involve tracking full rigid body motion employing three-dimensional models. These methods involve detection of face regions and face features, which require considerable computational power. These methods have the additional drawbacks of requiring specific sensors and/or a model initialization step. In addition, most of these complex models are not robust enough to handle noisy input or head poses outside a narrow range. Thus, conventional methods of head pose estimation and simulation are not practical for many applications, including use in animating avatars on mobile devices.

It may be desirable to provide methods and apparatus for head pose estimation that can be used to animate an avatar in low bandwidth applications and/or is low processing power applications (e.g., due to processor and/or power constraints), such as use on mobile devices. It may also be desirable to use a moving object, including but not limited to a real human head, in front of a camera to generate avatar control signals.

SUMMARY OF THE INVENTION

According to various aspects of the disclosure, a method for head pose estimation may include receiving block motion vectors for a frame of video from a block motion estimator, selecting at least one block for analysis, determining an average motion vector for the at least one selected block, accumulating the average motion vector with the average motion vectors calculated from previous frames, estimating the orientation of a portion of a user's head in the video frame based on the accumulated average motion vector for the at least one selected block, and outputting at least one parameter indicative of the estimated orientation.

In accordance with some aspects of the disclosure, an apparatus for head pose estimation may include a block motion estimator module and a head pose estimator. The block motion estimator module may be configured to receive frames of video. The head pose estimator may be configured to receive block motion vectors from the block motion estimator, select at least one block for analysis, determine an average motion vector for the at least one selected block, accumulate the determined average motion vector with average motion vectors from past frames of video, estimate the orientation of a user's head in the video frame based on the accumulated average motion vectors, and output at least one parameter indicative of the estimated orientation.

In various aspects of the disclosure, a wireless communication device may include a transceiver configured to send and receive signals, a block motion estimator module configured to receive frames of video, and a head pose estimator. The head pose estimator may be configured to receive block motion vectors from the block motion estimator, select at least one block for analysis, determine an average motion vector for the at least one selected block, accumulate the determined average motion vector with average motion vectors from past frames of video, estimate the orientation of a user's head in the video frame based on the accumulated average motion vector, and output at least one parameter indicative of the estimated orientation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used.

The present invention comprises a variety of embodiments, such as methods and apparatus and other embodiments that relate to the basic concepts of the invention.

Figure 1:
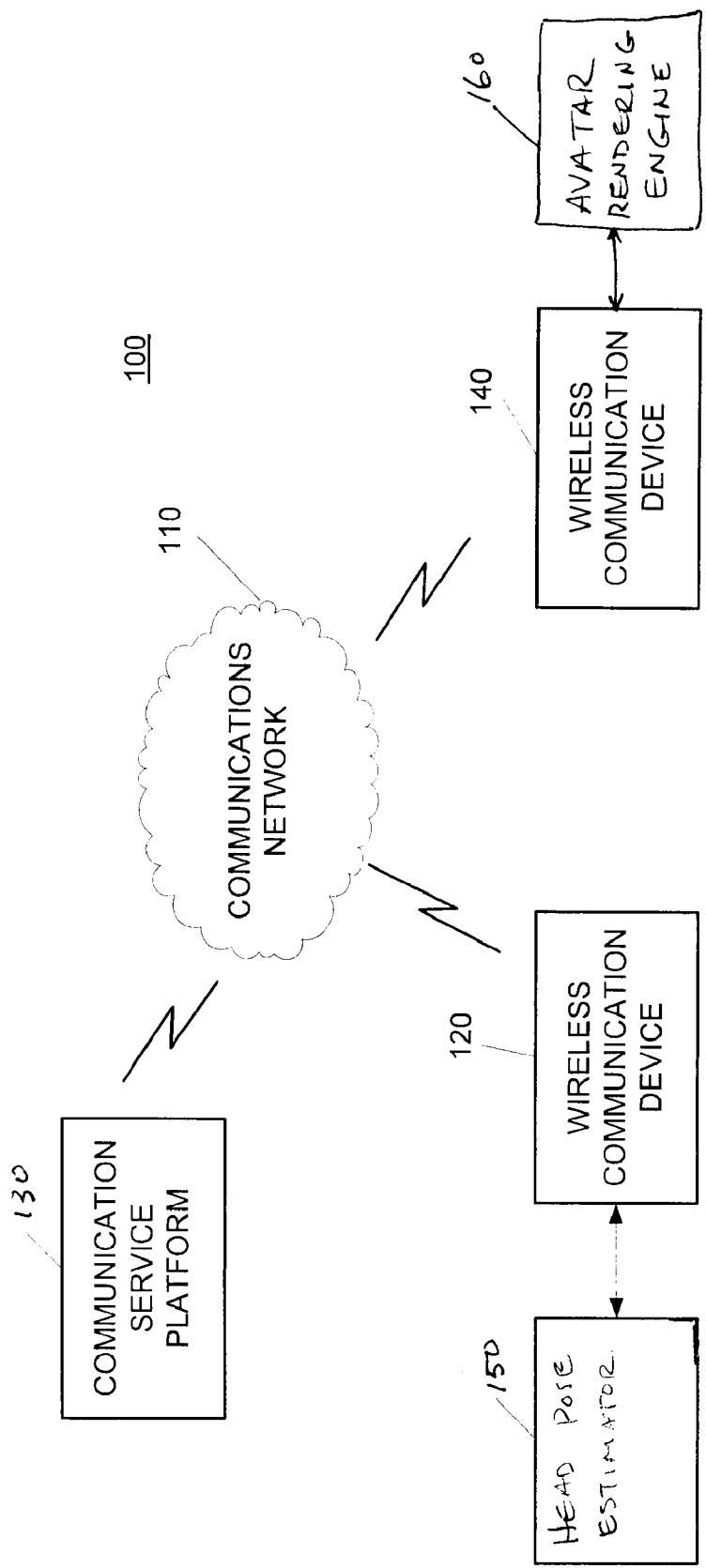
FIG. 1 illustrates an exemplary diagram of a head pose estimator operating in a communications network in accordance with a possible embodiment of the invention.

FIG. 1 illustrates a head pose estimator 150 operating in a communications network environment 100. The communications network environment 100, for example, a wireless communications system, includes communications network 110, a first wireless communication device 120, a communications service platform 130, and a second wireless communication device 140. The head pose estimator 150 is coupled to the first wireless communication device 120. An avatar rendering engine 160 may be coupled to the second wireless communication device 140.

Communications network 110 may represent any network known to one of skill in the art, including a wireless telephone network, cellular network, a wired telephone network, the Internet, wireless computer network, intranet, satellite radio network, etc. Wireless communication devices 120, 140 may represent wireless telephones, wired telephones, personal computers, portable radios, personal digital assistants (PDAs), MP3 players, satellite radio, satellite television, a global positioning system (GPS) receiver, etc.

The communications network 110 may allow first wireless communication device 120 to communicate with other wireless communication devices, such as second wireless communication device 140. Alternatively, first wireless communication device 120 may communicate through communications network 110 to a communications service platform 130 that may provide services such as media content, navigation, directory information, etc. to GPS devices, satellite radios, MP3 players, PDAs, radios, satellite televisions, etc. It should be appreciated that a wireless communication device may be configured to do head pose estimation for its user and render, or generate, an avatar for the remote user, in order to facilitate full duplex avatar communication.

Figure 2:
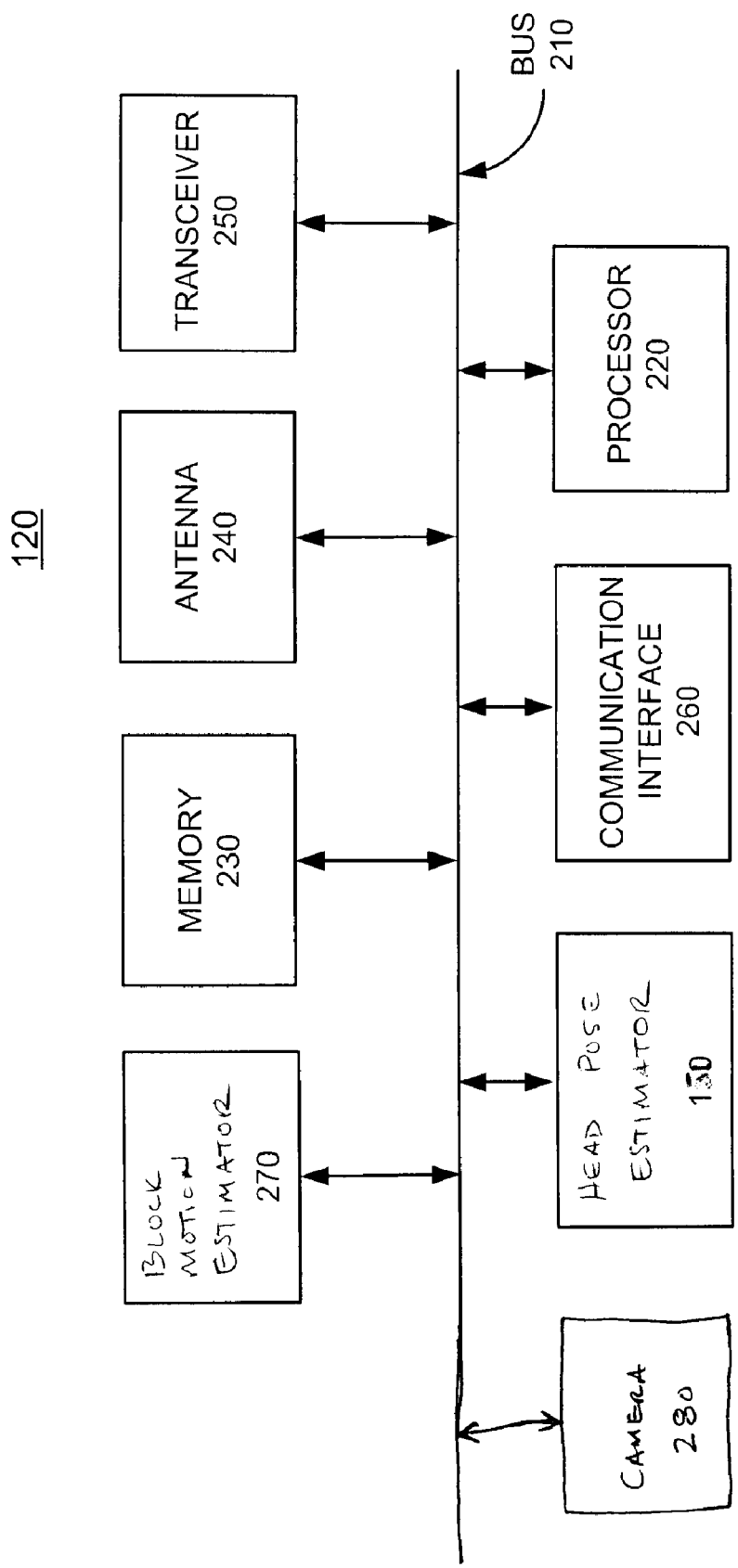
FIG. 2 illustrates a block diagram of an exemplary wireless communication device having a head pose estimator in accordance with a possible embodiment of the invention.

FIG. 2 illustrates a block diagram of an exemplary wireless communication device 120 having a head pose estimator 150 in accordance with a possible embodiment of the invention. The exemplary wireless communication device 120 may include a bus 210, a processor 220, a memory 230, an antenna 240, a transceiver 250, a communication interface 260, a block motion estimator module 270, a camera 280, and the head pose estimator 150. Bus 210 may permit communication among the components of the wireless communication device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network 110.

Communication interface 260 may include any mechanism that facilitates communication via the communications network 110. For example, communication interface 260 may include a modem. Alternatively, communication interface 260 may include other mechanisms for assisting the transceiver 250 in communicating with other devices and/or systems via wireless connections.

The block motion estimator module 270 may be configured to obtain block motion vectors for each input video frame received from the camera 280. It should be appreciated that the block motion estimator module 270 is typically available in video encoders provided, for example, in conventional 3G mobile devices equipped with a camera. Thus, the block motion vectors can be determined via block motion estimators of conventional video encoders.

The wireless communication device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

The communications network 110 and the wireless communication device 120 illustrated in FIGS. 1-2 and the related discussion are intended to provide a brief, general description of a suitable computing environment in which the invention may be implemented. Although not required, the invention will be described, at least in part, in the general context of computer-executable instructions, such as program modules, being executed by the wireless communication device 120, such as a communications server, or general purpose computer. Generally, program modules include routine programs, objects, components, data structures, etc. that perform particular tasks or implement particular abstract data types. Moreover, those skilled in the art will appreciate that other embodiments of the invention may be practiced in communication network environments with many types and combinations of communication equipment and computer system configurations, including cellular devices, mobile communication devices, personal computers, hand-held devices, multi-processor systems, microprocessor-based or programmable consumer electronics, and the like. For example, an embodiment can be practiced in a communication network that includes a personal computer and a mobile telephone configured to communicate with one another.

For illustrative purposes, the head pose estimation process will be described below in relation to the block diagrams shown in FIGS. 1 and 2.

Figure 3:
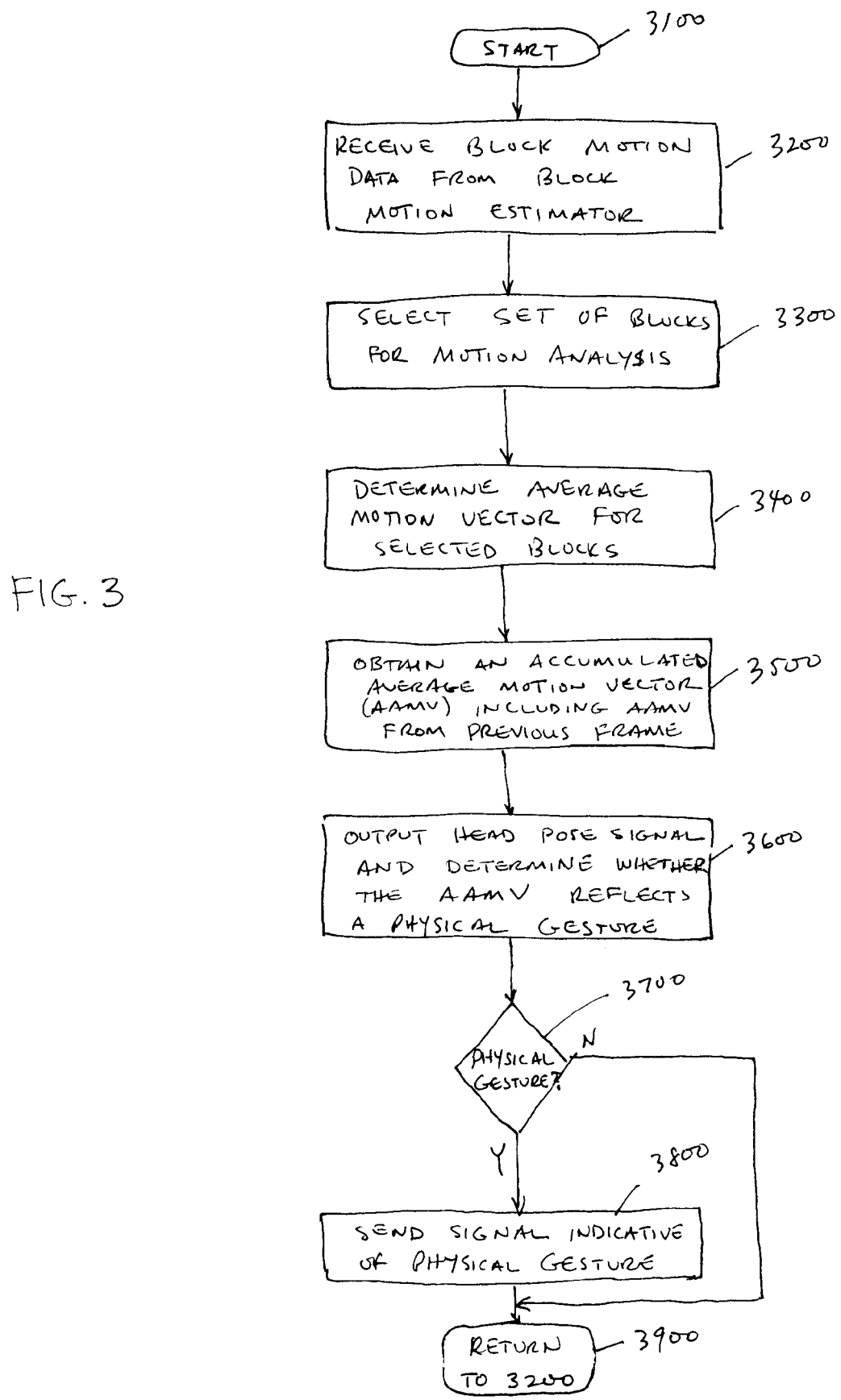
FIG. 3 is an exemplary flowchart illustrating one possible head pose estimation process in accordance with one possible embodiment of the invention.

FIG. 3 is an exemplary flowchart illustrating some of the basic steps associated with a head pose estimation process in accordance with a possible embodiment of the invention. The estimation process described with respect to FIG. 3 is an exemplary process for one component of the head pose estimator 150. For example, the estimation process described may be for a vertical component of the head pose estimation process, while at least one substantially similar process may also be carried out for a horizontal component and/or a vertical component of the head pose estimation process. The vertical and horizontal may then be combined to complete the head pose estimation, as will be understood by persons skilled in the art. It should also be appreciated that, alternatively, a methodology consistent with the disclosure may detect some combination of vertical and horizontal components jointly and perform head pose estimation based on the joint detection, as will be understood by persons skilled in the art.

For purposes of explanation, the process of FIG. 3 will estimate the vertical component of the head pose estimator. The process begins at step 3100 and continues to step 3200 where the head pose estimator 150 receives block motion vectors from the block motion estimator module 270. The block motion vectors are associated with a new video frame from the camera 280. Control continues to step 3300.

In step 3300, the head pose estimator 150 selects a set of blocks for motion analysis by comparing the magnitudes of the block motion vectors with a threshold. This dynamic selection process may be referred to as a region-of-interest filter. The threshold may be a fixed, predetermined threshold, or the threshold may be dynamically calculated and modified based on the block motion vectors of continuous video data received from the camera. The set of blocks selected for any give frame of data may differ from any or all of the blocks selected for previous frames of data.

Control then continues to step 3400 where the head pose estimator 150 determines an average motion vector for the selected blocks for the current frame. The average motion vector may comprise a spatial averaging process performed, over the selected set of blocks, for the current video frame whose data is being captured by the camera. Control then continues to step 3500. In step 3500, the head pose estimator 150 combines the average motion vector for the current frame with the average motion vectors from all previous frames of video to obtain an accumulated average motion vector (AAMV). That is, calculating the accumulated average motion vector comprises a temporal process that adds the average motion vector for the current frame to the accumulated average motion vector of the previous video frame. Since the selected set of blocks may differ from frame to frame, the head pose estimator 150 may include algorithms for combining average motion vectors for the differing sets of blocks, as would be understood by persons skilled in the art. Control then proceeds to step 3600.

Figure 4:
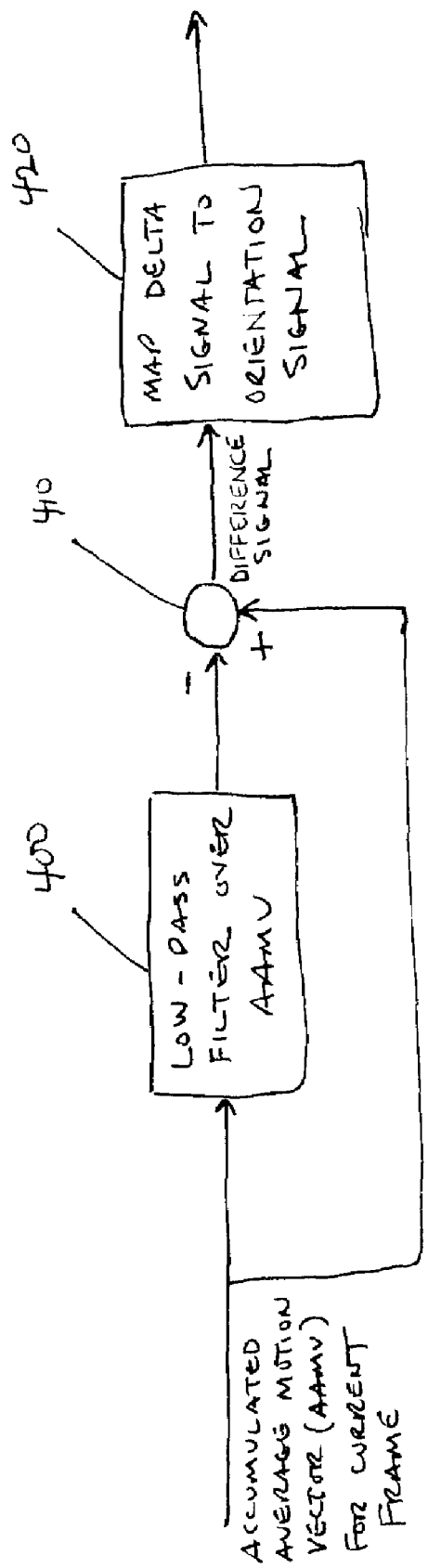
FIG. 4 is a block diagram showing an exemplary data flow in determining a head pose signal in accordance with a possible embodiment of the invention.

In step 3600, the head pose estimator 150 outputs head pose signal reflecting orientation of the user's head and determines whether the AAMV reflects a physical gesture. According to various aspects, the physical gesture may comprise a predetermined head gesture, such as, for example, a head nod or a head shake. The process for outputting a head pose signal is shown in more detail in FIG. 4. Referring to FIG. 4, the AAMV passes an optional low-pass filter 400 wherein the temporal draft is obtained. The estimated draft output from the filter 400 is then deducted from the AAMV at summation 410. The difference signal resulting from summation 410 is then mapped to an orientation signal (e.g., pitch angle) at 420. The orientation signal derived at 420 corresponds to the head pose signal of step 3600. The head pose signal contains rotation data corresponding to the pitch angle of the head upon which the camera 280 is directed. Similarly, for the horizontal component of the head pose estimation process, the head pose estimator 150 may send a signal containing rotation data corresponding to the yaw angle of the head of the user upon which the camera 280 is directed. In response to the signal from the head pose estimator, an avatar may be rendered, or generated, having a pose substantially corresponding to the estimated orientation of the user's head.

One skilled in the art will understand that the rotation data (i.e., pitch angle and/or yaw angle) is proportional to the vertical and horizontal components of the accumulated average motion vectors. Thus, the vertical and horizontal components of the accumulated average motion vectors can be mapped to the rotation data signal. In some aspects, a roll angle may also be somewhat derived from a combination of the horizontal and vertical components. It should be appreciated that, optionally, a low-pass filtered value from 400 over past frames may be deducted from the accumulated motion vector value, before mapping it to the output rotation angle, in order to counter the undesired drafting at the accumulated average motion vector. Nothing will be deducted from the accumulated average motion vector if optional low-pass filter 400 is not used. The rotation data signals may comprise non-binary floating values indicative of an orientation of the head of the user of the camera, for example, a head pose.

Referring again to step 3600, the head pose estimator 150 determines whether the accumulated average motion vector reflects a head nod (i.e., vertical movement) by a user on which the camera 280 is directed. This determination can be carried out via a threshold-based waveform classification technique so as to reduce noise caused by block motion estimation and/or camera noise.

For example, the head pose estimator 150 can continuously update a waveform generated from the accumulated average motion vectors through the latest. The waveform classification technique may set a zero-crossing threshold, thus classifying the waveform into three states, such as, for example, positive, negative, and zero. The zero state may be given a bandwidth corresponding to a desired threshold to account for noise.

The head pose estimator 150 may also include criteria for making a determination that a head nod has occurred. For example, the head pose estimator 150 may have to detect one down-and-up cycle of the waveform in order to make a determination that a nod has occurred. That is, the waveform must go from positive to negative and back to positive for a nod determination to be made. Similarly, for the horizontal component of the head pose estimation process, the head pose estimator 150 may have to detect one left-right cycle or one right-left cycle of the waveform in order to make a determination that a head shake has occurred.

The head pose estimator 150 may also be able to reject spikes due to noise in the motion vector waveform. For example, the head pose estimator 150 may require that a plurality of consecutive positive signals be received before making the determination that the waveform has moved into the positive state. The same requirement may apply to the negative signals. This feature can be implemented via any conventional counter system.

The process continues to step 3700, where, if a nod determination was made in step 3600, control continues to step 3800, where the head pose estimator 150 sends a signal to communication device 120 indicative of a head nod. In response to the signal from the head pose estimator, motion of an avatar may be controlled to imitate the physical gesture, for example, a head nod, based on the signal. The process then goes to step 3900 where control returns to step 3200 and continues to estimate head motion of a user of the camera 280.

Similarly, for the horizontal component of the head pose estimation process, if the head pose estimator 150 determines that a head shake was made, a signal indicative of a head shake is sent, for example, to the wireless communication device 120, and motion of an avatar may be controlled to imitate the physical gesture, for example, a head shake, based on the signal. The nod and shake signals may comprise binary signals that instruct a receiving device.

If, in step 3700, a nod determination is not made, the process goes to step 3900 where control returns to step 3200 and continues to estimate head motion of an object of the camera 280.

It should be appreciated that the head pose estimator 150 may reduce signal noise via state-regulated displacement integration of the average motion vector over time. The head pose estimator 150 may control drift of the head pose parameters by implementing an infinite impulse response low-pass filter, as would be known and understood by persons skilled in the art.

One skilled in the art will understand that the disclosed devices, apparatuses, and methods can be modified to estimate the orientation and/or gesturing of other portions of a user's body or another object associated with the user's body. For example, the disclosed devices, apparatuses, and methods can be modified to estimate the orientation and/or gesturing of a fist or a ball being grasped by the user.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be apparent to those skilled in the art that various modifications and variations can be made in the devices and methods of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method for head pose estimation, comprising:
   receiving block motion vectors for a frame of video from a block motion estimator;
   selecting at least one block for analysis;
   determining an average motion vector for the at least one selected block;
   combining the determined average motion vector with average motion vectors from past frames of video to obtain an accumulated average motion vector;
   estimating the orientation of a user's head in the video frame based on the accumulated average motion vector; and
   outputting at least one parameter indicative of the estimated orientation.

2. The method of claim 1, wherein the selecting includes comparing magnitudes of the received motion vectors with a threshold.

3. The method of claim 1, further comprising:
   determining whether the user's head in the video frame is making a physical gesture based on the accumulated average motion vector; and
   outputting a signal indicative of the physical gesture when it is determined that the physical gesture is made.

4. The method of claim 3, wherein the step of determining whether the user's head in the video frame is making a physical gesture comprises:
   generating a waveform of accumulated average motion vectors for the at least one selected block;
   classifying positions along the waveform as a positive, a negative, or a zero state;
   determining that a physical gesture has been made when the waveform completes one cycle; and
   sending a signal indicative of the physical gesture when it is determined that the physical gesture has been made.

5. The method of claim 4, wherein the physical gesture comprises one of a head nod and a head shake.

6. The method of claim 4, further comprising:
   generating an avatar having a pose substantially corresponding to the estimated orientation of the user's head; and
   controlling motion of the avatar to imitate the physical gesture based on the signal.

7. The method of claim 1, further comprising generating an avatar having a pose substantially corresponding to the estimated orientation of the user's head.

8. An apparatus for head pose estimation, comprising:
   a block motion estimator module configured to receive frames of video;
   a head pose estimator configured to receive block motion vectors from the block motion estimator, select at least one block for analysis, determine an average motion vector for the at least one selected block, combine the determined average motion vector with average motion vectors from past frames of video to obtain an accumulated average motion vector, estimate the orientation of a user's head in the video frame based on the accumulated average motion vector, and output at least one parameter indicative of the estimated orientation.

9. The apparatus of claim 8, wherein the head pose estimator is further configured to select the at least one block by comparing magnitudes of the received motion vectors with a threshold.

10. The apparatus of claim 8, wherein the head pose estimator is further configured to determine whether the user's head in the video frame is making a physical gesture based on the accumulated average motion vector and output a signal indicative of the physical gesture when it is determined that the physical gesture is made.

11. The apparatus of claim 10, wherein the head pose estimator determines whether the user's head is making a physical gesture by generating a waveform of accumulated average motion vectors across a number of past frames for the at least one selected block classifying positions along the waveform as a positive, a negative, or a zero state, and determining that a physical gesture has been made when the waveform completes one cycle, and the head pose estimator is further configured to send a signal indicative of the physical gesture when it is determined that the physical gesture has been made.

12. The apparatus of claim 10, wherein the physical gesture comprises one of a head nod and a head shake.

13. A wireless communication device, comprising:
a transceiver configured to send and receive signals;
a block motion estimator module configured to receive frames of video;
a head pose estimator configured to receive block motion vectors from the block motion estimator, select at least one block for analysis, determine an average motion vector for the at least one selected block, combine the determined average motion vector with average motion vectors from past frames of video to obtain an accumulated average motion vector, estimate the orientation of a user's head in the video frame based on the accumulated average motion vector for the at least one selected block, and output at least one parameter indicative of the estimated orientation.

14. The device of claim 13, wherein the head pose estimator is further configured to select the at least one block by comparing magnitudes of the received motion vectors with a threshold.

15. The device of claim 13, wherein the head pose estimator is further configured to determine whether the user's head in the video frame is making a physical gesture based on the accumulated average motion vector and output a signal indicative of the physical gesture when it is determined that the physical gesture is made.

16. The device of claim 15, wherein the head pose estimator determines whether the user's head is making a physical gesture by generating a waveform of accumulated average motion vectors for the at least one selected block classifying positions along the waveform as a positive, a negative, or a zero state, and determining that a physical gesture has been made when the waveform completes one cycle, and the head pose estimator is further configured to send a signal indicative of the physical gesture when it is determined that the physical gesture has been made.

17. The device of claim 15, wherein the physical gesture comprises one of a head nod and a head shake.

18. The device of claim 15, wherein the wireless communication device cooperates with a second communication device to form a wireless communication system, the second communication device being configured to generate an avatar having a pose substantially corresponding to the estimated orientation of the user's head and control motion of the avatar to imitate the physical gesture based on the signal.

19. The device of claim 13, wherein the wireless communication device cooperates with a second communication device to form a wireless communication system, the second communication device being configured to generate an avatar having a pose substantially corresponding to the estimated orientation of the user's head.

* * * * *